US012801550B2

(12) United States Patent
Varadharajan et al.

(10) Patent No.: US 12,801,550 B2
(45) Date of Patent: Nov. 17, 2026

(54) DEVICE, SYSTEM AND METHODS FOR ACCESSING MULTIPLE NVMe NAMESPACES

(71) Applicant: Microchip Touch Solutions Limited, Wokingham (GB)

(72) Inventors: Prasanna Vengateshan Varadharajan, Chennai (IN); Richard Cannon, Frodsham (GB); Pragash Mangalapandian, Chennai (IN); Atish Ghosh, Austin, TX (US); Ram Kumar Velladurai, Chennai (IN)

(73) Assignee: Microchip Touch Solutions Limited, Wokingham (GB)

( * ) Notice: Subject to any disclaimer, the term of this patent is extended or adjusted under 35 U.S.C. 154(b) by 54 days.

(21) Appl. No.: 19/079,594

(22) Filed: Mar. 14, 2025

(65) Prior Publication Data

US 2026/0037467 A1 Feb. 5, 2026

(30) Foreign Application Priority Data

Aug. 1, 2024 (IN) ............................ 202411058533

(51) Int. Cl.
*G06F 13/00* (2006.01)
*G06F 9/455* (2018.01)
*G06F 13/40* (2006.01)

(52) U.S. Cl.
CPC ...... *G06F 13/4022* (2013.01); *G06F 9/45558* (2013.01); *G06F 13/4027* (2013.01); *G06F 2009/45579* (2013.01)

(58) Field of Classification Search
CPC ............ G06F 13/4022; G06F 9/45558; G06F 13/4027; G06F 2009/45579
See application file for complete search history.

(56) References Cited

U.S. PATENT DOCUMENTS

| | | | | |
|---|---|---|---|---|
| 2021/0038980 | A1 | 2/2021 | Colenbrander | |
| 2023/0051825 | A1 * | 2/2023 | Chang | G06F 3/061 |
| 2024/0361959 | A1 * | 10/2024 | Piao | G06F 3/0644 |
| 2024/0362056 | A1 * | 10/2024 | Brown, Jr. | G06F 9/45558 |

OTHER PUBLICATIONS

International Search Report and Written Opinion, Application No. PCT/EP2025/070397, 12 pages, Oct. 10, 2025.

* cited by examiner

*Primary Examiner* — Henry Tsai
*Assistant Examiner* — Kim T Huynh
(74) *Attorney, Agent, or Firm* — SLAYDEN GRUBERT BEARD PLLC

(57) ABSTRACT

A system may include a PCIe switch device. The PCIe switch may include multiple partitions, the multiple partitions including respective partitions coupled to respective hosts, and an internal partition not coupled to a host. The PCIe switch may include a hypervisor namespace administrator (HNA), the HNA including respective logical virtual functions (LVFs), the LVF to receive transactions from respective hosts and to allow access to multiple namespaces within an NVMe device coupled to the internal partition.

39 Claims, 2 Drawing Sheets

DEVICE, SYSTEM AND METHODS FOR ACCESSING MULTIPLE NVMe NAMESPACES

PRIORITY

This application claims priority to commonly owned Indian Provisional Patent Application No. 202411058533 filed Aug. 1, 2024, the entire contents of which are hereby incorporated by reference for all purposes.

FIELD OF THE INVENTION

The present disclosure relates to a device, system and method for accessing multiple namespaces within a Non-Volatile Memory (NVM) using the Non-Volatile Memory Express (NVMe) protocol across multiple hosts.

BACKGROUND

The NVMe (Non-Volatile Memory Express) protocol is a high-performance, scalable host interface designed to address the needs of NVM storage, such as NAND flash and next-generation solid-state drives (SSDs). NVMe utilizes the parallelism of PCIe (Peripheral Component Interconnect Express) protocol.

In an NVMe system, a host may access sections of the NVM memory, these sections may be termed namespaces. Multiple hosts may connect to a single NVM device and may access multiple namespaces within the NVM memory over a PCIe system. Accessing multiple namespaces across multiple hosts may utilize multiple controllers, multiple ports, host software or virtualization support in the NVMe drive which may increase cost, complexity and access times. Accessing multiple namespaces across multiple hosts may also involve proprietary software and drivers running on each of the multiple hosts to share NVMe namespaces.

There is a need for device, systems and methods to enable multiple hosts to access multiple namespaces in an NVMe device without the need for multiple controllers, multiple ports, additional software or drivers in the respective hosts.

SUMMARY

The examples herein enable a device, system and method for accessing multiple namespaces within a Non-Volatile Memory (NVM) device using the Non-Volatile Memory Express (NVMe) protocol across multiple hosts.

According to one aspect, a device includes a memory-mapped address space, the memory-mapped address space comprising a plurality of partitions. The memory-mapped address space includes a first partition, the first partition not coupled to one of a plurality of hosts. The first partition includes a virtual root complex circuit and a downstream port, the downstream port coupled to a Non-Volatile Memory Express (NVMe) device. The NVMe device includes at least one admin controller circuit, at least one input/output (I/O) controller circuit, a non-volatile memory and a plurality of namespaces. The admin controller circuit may provide management capabilities and the I/O controller circuit may provide access to one or more of the plurality of namespaces in the non-volatile memory. The memory-mapped address space includes a second partition coupled to one of the plurality of hosts. The second partition may include at least one upstream port, at least one downstream port, and a first logical virtual function coupled to the at least one downstream port. The memory-mapped address space includes a third partition coupled to one of the plurality of hosts. The third partition may include at least one upstream port, at least one downstream port, and a second logical virtual function coupled to the at least one downstream port. The memory-mapped address space includes a processor capable of loading and executing instructions and a non-transparent bridging circuit capable of routing transactions across the plurality of partitions. The memory-mapped address space includes a hypervisor namespace administrator, the hypervisor namespace administrator including a plurality of logical virtual functions, and an arbitrator. The hypervisor namespace administrator may receive transactions from at least one host and the NVMe device and may emulate virtual NVMe devices and may allow access to the plurality of namespaces based on configuration information and arbitration logic implemented by the arbitrator.

According to one aspect, a system includes a Peripheral Component Interconnect Express (PCIe) switch to be communicatively coupled to a plurality of hosts. The PCIe switch may include a memory-mapped address space. The memory-mapped address space may include a plurality of partitions. The first partition may not be coupled to one of the plurality of hosts. The first partition may include a virtual root complex circuit and a downstream port. The downstream port may be coupled to a Non-Volatile Memory Express (NVMe) device. The NVMe device may include at least one admin controller circuit, at least one I/O controller circuit, a non-volatile memory and a plurality of namespaces. The admin controller circuit may provide management capabilities and the I/O controller circuit may provide access to one or more of the plurality of namespaces in the non-volatile memory. The memory-mapped address space may include a second partition coupled to one of the plurality of hosts. The second partition may include at least one upstream port, at least one downstream port, and a first logical virtual function coupled to the at least one downstream port. The memory-mapped address space may include a third partition coupled to one of the plurality of hosts. The third partition may include at least one upstream port, at least one downstream port, and a second logical virtual function coupled to the at least one downstream port. The memory-mapped address space may include a processor capable of loading and executing instructions and a non-transparent bridging circuit capable of routing transactions across the plurality of partitions. The memory-mapped address space may include a hypervisor namespace administrator. The hypervisor namespace administrator may include a plurality of logical virtual functions, and an arbitrator. The hypervisor namespace administrator may receive transactions from at least one host and the NVMe device and may emulate virtual NVMe devices and may allow access to the plurality of namespaces based on configuration information and arbitration logic implemented by the arbitrator.

According to one aspect, a method includes steps of: configuring a PCIe switch to include a plurality of partitions, and to include one partition per host, respective hosts to be communicatively coupled to respective partitions, configuring an additional partition, the additional partition to be communicatively coupled to an NVMe device, the NVMe device comprising a plurality of namespaces and the NVMe device not visible to any of the hosts, configuring, in a hypervisor namespace administrator, a logical virtual function in respective partitions, emulating a virtual NVMe device by the LVF to control access to one or more namespaces in the NVMe device, selecting an active host from the plurality of hosts by an arbitrator in the hypervisor namespace administrator, allowing, via the arbitrator, the active host to access the NVMe device, suspending temporarily, via the arbitrator, access from the non-active hosts to the NVMe device, processing, by the hypervisor namespace administrator, one or more transactions at the respective LVFs through operations comprising at least one of an emulation of data, a bridging of transactions, a monitoring of transactions, creation of transactions and an update of transactions, transactions comprising PCIe configuration transactions, NVMe admin transactions and NVMe I/O transactions.

DETAILED DESCRIPTION

Figure 1:
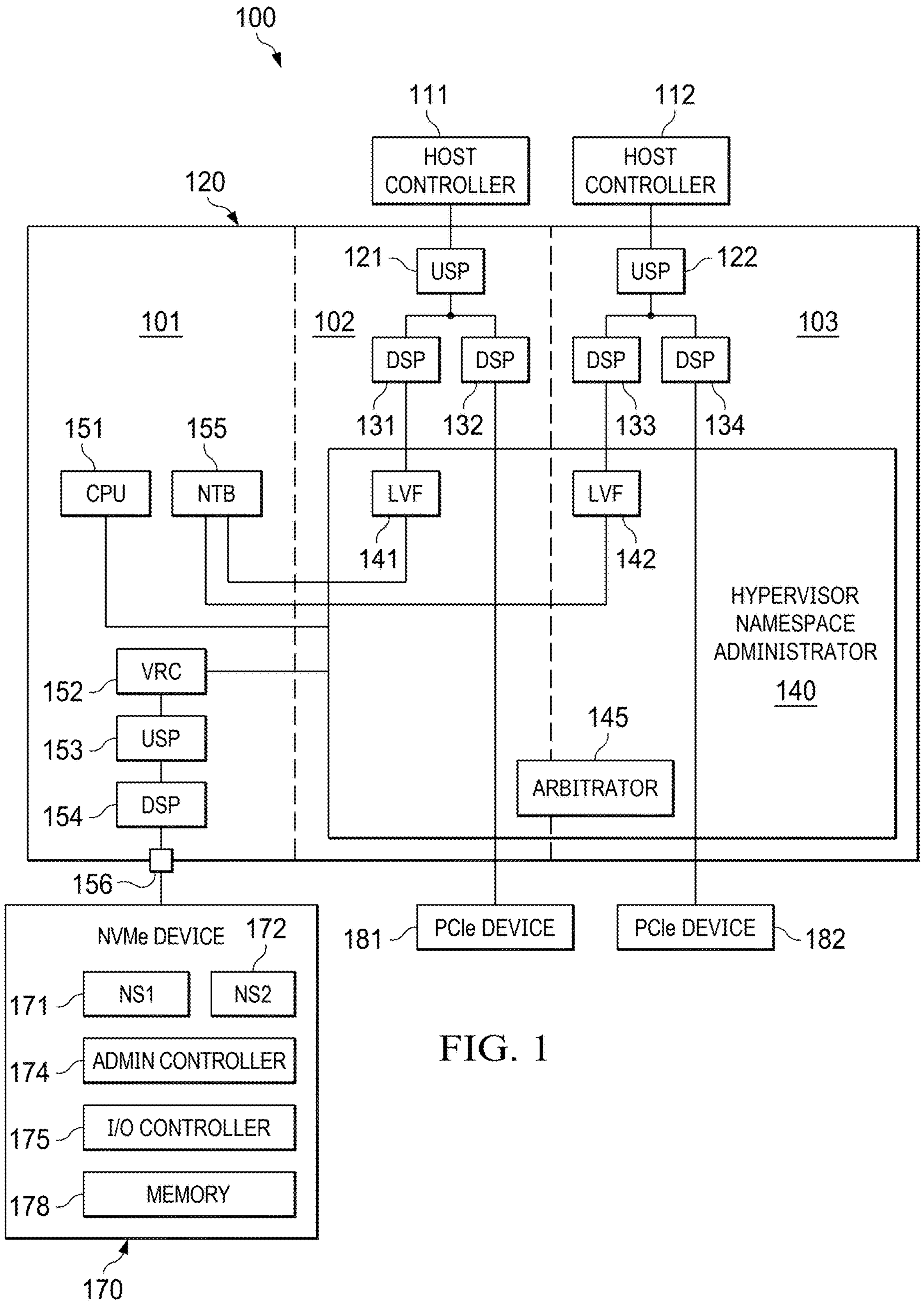
FIG. 1 illustrates one of various examples of a system for accessing multiple namespaces across multiple hosts.

FIG. 1 illustrates one of various examples of a system 100 for accessing multiple namespaces across multiple hosts.

System 100 may include a first host 111, and a second host 112. The example of FIG. 1 includes two hosts, but this is not intended to be limiting. Other examples may include a single host, or may include more than two hosts.

First host 111 may be coupled to PCIe switch 120. First host 111 and PCIe switch 120 may communicate utilizing the PCIe communication protocol. First host 111 may be coupled to first upstream port 121.

Second host 112 may be coupled to PCIe switch 120. Second host 112 and PCIe switch 120 may communicate utilizing the PCIe communication protocol. Second host 112 may be coupled to second upstream port 122.

PCIe switch 120 may include a memory-mapped address space which may be accessed by transactions received from first host 111 and second host 112. PCIe switch 120 may be part of an Advanced Driver Assistance System (ADAS).

First upstream port 121 may be coupled to one or more downstream ports. In the example illustrated in FIG. 1, first upstream port 121 is coupled to first downstream port 131 and second downstream port 132, but this is not intended to be limiting.

Second upstream port 122 may be coupled to one or more downstream ports. In the example illustrated in FIG. 1, second upstream port 122 is coupled to third downstream port 133 and fourth downstream port 134, but this is not intended to be limiting.

First upstream port 121 may receive transactions from first host 111. First upstream port 121, if transactions are to be passed downstream, may pass received transactions to at least one of first downstream port 131 second downstream port 132. In one of various examples, second downstream port 132 may operate in a pass-through mode and may communicate directly with first PCIe device 181 and with additional downstream devices.

PCIe switch 120 may include Hypervisor Namespace Administrator (HNA) 140, which may communicate and process transactions between the partitions of PCIe switch 120. HNA 140 may include arbitrator 145. HNA 140 may receive transactions from at least one of first host 111 and second host 112 and from NVMe device 170. In operation, HNA 140 may emulate virtual NVMe devices and may allow access to the plurality of namespaces based on configuration information and based on arbitration logic in arbitrator 145. Configuration information used by HNA 140 may include configuration information stored in PCIe switch 120 or configuration information read during enumeration or configuration information as part of one or more configuration transactions.

First downstream port 131 may be coupled to first Logical Virtual Function (LVF) 141. First LVF 141 may be a firmware component of HNA 140. First LVF 141 may emulate a virtual NVMe device to first host 111. First LVF 141 may be configured based on configuration data read during the enumeration of NVMe device 170.

In operation, first LVF 141 may receive transactions from first downstream port 131 and NVMe device 170. Arbitrator 145 may allow access from first host 111 to a first namespace (NS1) 171 of NVMe device 170 through first LVF 141. Arbitrator 145 may select one of first host 111 and second host 112 as an active host. Arbitrator 145 may allow the active host to access NVMe device 170 and may block access by all other hosts while the active host is accessing NVMe device 170. Hosts blocked by arbitrator 145 may also be termed non-active hosts. Intimation of command doorbells and other such messages for NVMe commands issued by the non-active hosts are kept pending by HNA 140 until the non-active hosts are selected as an active host by arbitrator 145.

Transactions may include PCIe configuration transactions, NVMe admin transactions, NVMe Input-Output (I/O) transactions. Transactions may include multiple fields of data, the fields of data to indicate at least one of a source address, a destination address, a data payload, an interrupt condition and status information. PCIe configuration transactions may read and write registers within a configuration space in first LVF 141 and within NVMe device 170. NVMe Admin transactions may read and write registers within an admin space in first LVF 141 and within NVMe device 170. NVMe I/O transactions may read data or write data accessing non volatile memory within first LVF 141 and within NVMe device 170.

Second upstream port 122 may receive transactions from second host 112. Second upstream port 122, if transactions are to be passed downstream, may pass received transactions to at least one of third downstream port 133 and fourth downstream port 134. In one of various examples, fourth downstream port 134 may operate in a pass-through mode and may communicate directly with second PCIe device 182 and with additional downstream devices.

Second downstream port 132 may be coupled to second Logical Virtual Function (LVF) 142. Second LVF 142 may be a firmware component of HNA 140. Second LVF 142 may emulate a virtual NVMe device to second host 112. Second LVF 142 may be configured based on configuration data read during the enumeration of system 100.

PCIe switch 120 may be configured to include a plurality of partitions. In the example illustrated in FIG. 1, PCIe switch 120 includes three partitions, but this is not intended to be limiting.

PCIe switch 120 may include central processing unit (CPU) 151. CPU 151 may be coupled to HNA 140. Firmware instructions within PCIe switch 120 may be executed by CPU 151. PCIe switch 120 may include Non-Transparent Bridging Circuit (NTB) 155. NTB 155 may be coupled to first LVF 141, second LVF 142 and to HNA 140. NTB 155 may route transactions between first partition 101, second partition 102 and third partition 103. In examples with more than three partitions or fewer than three partitions, NTB 155 may route transactions between all partitions. CPU 151 may be a processor, controller or other component capable to load and execute firmware instructions.

First partition 101 may include virtual root complex circuit (VRC) 152. VRC 152 may be coupled to HNA 140 and a third upstream port 153. The third upstream port 153 may be coupled to one or more downstream ports. In the example illustrated in FIG. 1, the third upstream port 153 is coupled to fifth downstream port 154, but this is not intended to be limiting. Fifth downstream port 154 may be coupled to namespace sharing port 156.

First partition 101 may also be termed an internal partition. First partition 101 may not be coupled to a host.

Namespace sharing port 156 may be coupled to NVMe device 170. NVMe device may include one or more namespaces. The example illustrated in FIG. 1 includes two namespaces, NS1 171 and second namespace (NS2) 172, but this is not intended to be limiting. NS1 171 and NS2 172 may enable access to portions of memory 178.

NVMe device 170 may include admin controller circuit 174, I/O controller circuit 175 and memory 178. I/O controller circuit 175 may include one or more I/O queues to manage transactions to and from NVMe device 170. The one or more I/O queues may be split in a predetermined manner and assigned to first host 111 and second host 112 by HNA 140.

In operation, admin controller circuit 174 may provide management capabilities and may allow HNA 140 to manage the NVMe device 170. In operation, I/O controller circuit 175 may provide access to one or more of the plurality of namespaces in memory 178. Admin controller circuit 174 may be managed by HNA 140.

Second partition 102 may include first upstream port 121, first downstream port 131 and second downstream port 132. Second partition 102 may include first LVF 141 and first LVF 141 may be coupled to first downstream port 131. Second partition 102 may be coupled to HNA 140.

Third partition 103 may include second upstream port 122, third downstream port 133 and fourth downstream port 134. Third partition 103 may include second LVF 142 and second LVF 142 may be coupled to third downstream port 133. Third partition 103 may be coupled to HNA 140.

In operation, first host 111 may be configured to communicate with second partition 102 and second host 112 may be configured to communicate with third partition 103. NVMe device 170 may be attached to first partition 101. HNA 140 may enumerate NVMe device 170 through VRC 152. HNA 140 may manage Admin controller circuit 174 and I/O controller circuit 175 and configure NVMe device 170. VRC 152 may be responsible for enumeration of PCIe devices attached to first partition 101, configuration of PCIe devices attached to first partition 101, and resource allocation of memory space and interrupts.

First LVF 141 may emulate a virtual NVMe device coupled to first host 111. First host 111 may access one or more namespaces of NVMe device 170 through first LVF 141 based on configuration information. Configuration information of I/O controller circuit 175 and NS1 171 may be read and stored by HNA 140 and may be accessed during emulation by first LVF 141.

NS1 171 and memory 178 may be emulated by first LVF 141 coupled to first host 111.

Second LVF 142 may emulate a virtual NVMe device coupled to second host 112. Second host 112 may access one or more namespaces of NVMe device 170 through second LVF 142 based on configuration information. Configuration information of I/O controller circuit 175 and NS2 172 may be read and stored by HNA 140 and may be accessed during emulation by second LVF 142.

NS2 172 and memory 178 may be emulated by second LVF 142 coupled to second host 112.

In operation, PCIe configuration transactions from first host 111 to first LVF 141 may be processed by the hypervisor namespace administrator and CPU 151. The PCIe configuration space of NVMe device 170 may be managed by firmware in PCIe switch 120 and may be stored, and processed locally for emulation by first LVF 141 and second LVF 142, which may be accessed by first host 111 and second host 112 respectively. In operation, HNA 140 may configure NVMe device 170 to allow access to NS1 171 and NS2 172 by first host 111 and second host 112.

Memory transactions, Input-Output (IO) transactions, interrupts and messages from first host 111 to first LVF 141 may be bridged to NVMe device 170 targeting NS1 171. Memory transactions, Input-Output (IO) transactions, interrupts and messages from second host 112 to second LVF 142 may be bridged to NVMe device 170 targeting NS2 172.

In operation, NS1 171 may be attached to first host 111 and NS2 172 may be attached to second host 112, however other combinations of association of one or more namespace to one or more host is also possible. HNA 140 may bridge PCIe transactions received from first host 111 to NS1 171 within NVMe device 170. HNA 140 may bridge PCIe transactions received from second host 112 to NS2 172 within NVMe device 170.

HNA 140 may regulate access by first host 111 and second host 112 to NVMe device 170 through bridging first LVF 141 to NVMe device 170 and second LVF 142 to NVMe device 170. HNA 140 may apply a set of rules in NTB 155 when crossing a partition boundary. As one of various examples, HNA 140 may cross from second partition 102 to first partition 101 when allowing first host 111 to access NVMe device 170.

In operation, first LVF 141 may be attached to first host 111. Configuration memory space of first LVF 141 may be emulated locally in HNA 140 using a stored buffer based on configuration data read from NVMe device 170 through first partition 101. First host 111 may see first LVF 141 as a PCIe device attached to first host 111 through first downstream port 131. Second LVF 142 may be attached to second host 112. Configuration memory space of second LVF 142 may be emulated locally in HNA 140 using a stored buffer. Second host 112 may see second LVF 142 as a PCIe device attached to second host 112 through third downstream port 133.

In operation, HNA 140 may apply operations on the transactions between host and the NVMe device, operations comprising at least one of: emulation of data, bridging of transactions, monitoring of transactions, creation of transactions and update of transactions. Emulation of data may be applied based on a determination that the response to the transaction is available within HNA 140. Bridging of a transaction between the active host and NVMe device 170 may be applied based on a determination that the active host may be capable to provide access to NVMe device 170 through one of first LVF 141 and second LVF 142. The monitoring of transactions between the active host and NVMe device 170 may be applied based on a determination that completion of an I/O transaction that another host may be an active host and may access NVMe device 170. Creating transactions may be based on a determination that additional transactions may determine the status of I/O transaction completion. Updating transactions between the active host and NVMe device 170 based on a determination that at least one of the fields in the transaction are to be updated based on a predetermined condition.

In operation, PCIe configuration transactions to first LVF 141 are routed to firmware and processed by CPU 151. PCIe configuration transactions to second LVF 142 are routed to firmware and processed by CPU 151. Legacy PCIe functions and extended capabilities may be emulated in first LVF 141 and second LVF 142 based on capabilities of NVMe device 170 determined by VRC 152 during enumeration.

In operation, admin commands may be emulated by first LVF 141 and second LVF 142. Firmware may manage emulation of admin commands, and VRC 152 may initiate admin commands to NVMe device 170.

HNA 140 may utilize NTB 155 to support communication among multiple partitions.

In operation, system 100 may couple one or more namespaces to one or more hosts through logical virtual functions. In the example illustrated in FIG. 1, system 100 may couple NS1 171 and NS2 172 to first host 111 and second host 112 through first LVF 141 and second LVF 142, but this specific number of namespaces, hosts and LVFs is for illustrative purposes and is not intended to be limiting.

The number of hosts, upstream ports, downstream ports, LVFs and PCIe devices illustrated in the example of FIG. 1 is not intended to be limiting.

Figure 2:
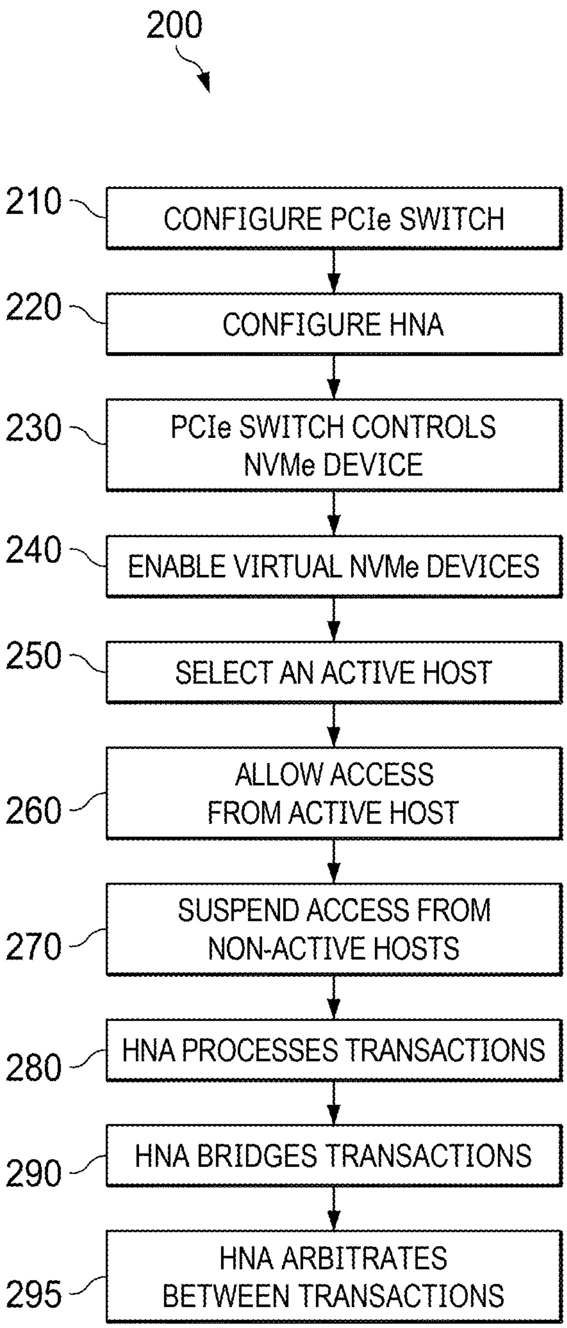
FIG. 2 illustrates a method of accessing multiple namespaces across multiple hosts.

FIG. 2 illustrates a method of accessing multiple namespaces. In one of various examples, a plurality of PCIe hosts may access multiple namespaces within an NVMe device. A system 100 as described and illustrated in reference to FIG. 1 may utilize the method of FIG. 2 and PCIe switch 120 may control access to NS1 171 and NS2 172 by first host 111 and second host 112.

At operation 210, a PCIe switch may be configured to have one partition per host, and to have an additional partition not coupled to any host. The additional partition, also termed an internal partition, may be coupled to an NVMe device. The NVMe device may be a solid-state drive, or another type of non-volatile storage technology and the NVMe device may include multiple namespaces. The NVMe device may not be coupled to any host.

At operation 220, the PCIe switch may configure a hypervisor namespace administrator (HNA), the HNA to include a logical virtual function in respective partitions. A VRC may enumerate PCIe devices attached to the PCIe switch.

At operation 230, the PCIe switch may control the NVMe device in dedicated PCIe domain of the switch internally and may not be visible to any of the hosts. The NVMe device may include multiple namespaces.

At operation 240, the logical virtual function (LVF) to emulate a virtual NVMe device to control access to one or more namespaces in the NVMe device.

At operation 250, the HNA may select an active host from the plurality of hosts in a predetermined manner.

At operation 260, the arbitrator may allow access from the active host to the NVMe device.

At operation 270, the arbitrator may allow temporarily suspend access from the non-active hosts to the NVMe device.

At operation 280, the hypervisor namespace administrator may process transactions received from one or more of the hosts. Transactions may be processed at the respective LVFs through operations comprising at least one of an emulation of data, a bridging of transactions, a monitoring of transactions, creation of transactions and an update of transactions, transactions comprising PCIe configuration transactions, NVMe admin transactions and NVMe I/O transactions.

HNA may emulate data upon a determination that the response required for a transaction is available within the HNA.

HNA may bridge transactions between the active host and the NVMe device upon a determination that the active host can be provided access to the NVMe device.

HNA may monitor transactions between the active host and the NVMe device upon a determination that a completion of a NVMe I/O command is to be determined indicating that access from the active host to the NVMe device could be temporarily suspended and another host could become a new active host and provided access to the NVMe device without causing any failures to the active host.

HNA may create transactions to the host and the NVMe device upon a determination that transactions are required to determine the status of NVMe I/O command completion.

HNA may update transactions between the host and the NVMe device upon a determination that at least one of the fields in the transaction to be updated in a predetermined manner based on a predetermined condition.

Arbitration may be used to sequence multiple transactions received at respective LVFs. Arbitration may be a priority-based arbitration, a round-robin arbitration, or another arbitration technique not specifically mentioned. A priority-based arbitration may arbitrate based on a predetermined priority of transactions. A round-robin arbitration may arbitrate based sequencing transactions at respective LVFs in turn.

At operation 290, the HNA may bridge transactions between hosts and the NVMe device to enable access to the NVMe device by one or more hosts.

At operation 295, the PCIe switch may arbitrate between received transactions based on a predetermined condition.

The invention claimed is:

1. A device comprising:

a memory-mapped address space, the memory-mapped address space comprising a plurality of partitions;

a first partition, the first partition not coupled to one of a plurality of hosts, the first partition comprising a virtual root complex circuit and a downstream port, the downstream port coupled to a Non-Volatile Memory Express (NVMe) device, the NVMe device comprising at least one admin controller circuit, at least one input/output (I/O) controller circuit, a non-volatile memory and a plurality of namespaces, the admin controller circuit to provide management capabilities and the I/O controller circuit to provide access to one or more of the plurality of namespaces in the non-volatile memory;

a second partition coupled to one of the plurality of hosts, the second partition comprising at least one upstream port, at least one downstream port, and a first logical virtual function coupled to the at least one downstream port;

a third partition coupled to one of the plurality of hosts, the third partition comprising at least one upstream port, at least one downstream port, and a second logical virtual function coupled to the at least one downstream port;

a processor capable of loading and executing instructions;

a non-transparent bridging circuit capable of routing transactions across the plurality of partitions; and a hypervisor namespace administrator, the hypervisor namespace administrator comprising a plurality of logical virtual functions, and an arbitrator, the hypervisor namespace administrator to receive transactions from at least one host and the NVMe device and to emulate virtual NVMe devices and to allow access to the plurality of namespaces based on configuration information and arbitration logic implemented by the arbitrator.

2. The device as claimed in claim 1, the transactions comprising PCIe configuration transactions, NVMe admin transactions and NVMe I/O transactions.

3. The device as claimed in claim 1, the NVMe device comprising at least one I/O queue, and wherein the NVMe device is enumerated in the first partition by the hypervisor namespace administrator through the virtual root complex circuit, the admin controller circuit and the at least one I/O queue of the NVMe device managed by the hypervisor namespace administrator.

4. The device as claimed in claim 3, the I/O queues in the NVMe device to be split and assigned to the plurality of hosts by the hypervisor namespace administrator.

5. The device as claimed in claim 1, wherein configuration information of the I/O controller circuit and a first namespace of the plurality of namespaces is read and stored by the hypervisor namespace administrator for emulation by the first logical virtual function.

6. The device as claimed in claim 1, wherein configuration information of the I/O controller circuit and a second namespace of the plurality of namespaces is read and stored by the hypervisor namespace administrator for emulation by the second logical virtual function.

7. The device as claimed in claim 5, wherein the first namespace of the plurality of namespaces and the respective NVMe device is emulated by the first logical virtual function coupled to a first host of the at least one host.

8. The device as claimed in claim 6, wherein the second namespace of the plurality of namespaces and the respective NVMe device is emulated by the second logical virtual function coupled to a second host of the at least one host.

9. The device as claimed in claim 1, wherein the plurality of namespaces are coupled to the at least one host through respective logical virtual functions.

10. The device as claimed in claim 1, wherein the arbitrator allows access from one of the at least one host to one of the plurality of namespaces of the NVMe device through the logical virtual function coupled to the respective host.

11. The device as claimed in claim 1, wherein the arbitrator selects an active host from the plurality of hosts, the active host allowed to access the NVMe device and the arbitrator to temporarily suspend access to the NVMe device by non-active hosts.

12. The device as claimed in claim 11, transactions between the at least one host and the NVMe device to be processed by the hypervisor namespace administrator through operations comprising at least one of an emulation of data, a bridging of transactions, a monitoring of transactions, creation of transactions and an update of transactions.

13. The device as claimed in claim 12, the emulation of data to be applied based upon a determination that a response for the transaction is available within the hypervisor namespace administrator.

14. The device as claimed in claim 12, the bridging transactions between the active host and the NVMe device to be applied based upon a determination that the active host is capable to access to the NVMe device through the logical virtual function coupled to the respective host.

15. The device as claimed in claim 12, the monitoring of transactions between the active host and the NVMe device to be applied based upon a determination that a completion of an I/O transaction indicates another host to become a new active host and provide access to the NVMe device.

16. The device as claimed in claim 12, the creation of transactions to the active host and the NVMe device based upon a determination that additional transactions are capable to determine a status of NVMe I/O command completion.

17. The device as claimed in claim 12, updating transactions between the active host and the NVMe device based on a determination that at least one field in the transaction is to be updated.

18. The device as claimed in claim 1, the device comprising a PCIe switch.

19. The device as claimed in claim 1, the device comprising at least one downstream port configured in a pass-through mode to communicate with downstream devices.

20. A system comprising:

a Peripheral Component Interconnect Express (PCIe) switch to be communicatively coupled to a plurality of hosts, the PCIe switch comprising:

a memory-mapped address space, the memory-mapped address space comprising a plurality of partitions;

a first partition not coupled to one of the plurality of hosts, the first partition comprising a virtual root complex circuit and a downstream port, the downstream port coupled to a Non-Volatile Memory Express (NVMe) device, the NVMe device comprising at least one admin controller circuit, at least one I/O controller circuit, a non-volatile memory and a plurality of namespaces, the admin controller circuit to provide management capabilities and the I/O controller circuit to provide access to one or more of the plurality of namespaces in the non-volatile memory;

a second partition coupled to one of the plurality of hosts, the second partition comprising at least one upstream port, at least one downstream port, and a first logical virtual function coupled to the at least one downstream port;

a third partition coupled to one of the plurality of hosts, the third partition comprising at least one upstream port, at least one downstream port, and a second logical virtual function coupled to the at least one downstream port;

a processor capable of loading and executing instructions;

a non-transparent bridging circuit capable of routing transactions across the plurality of partitions; and a hypervisor namespace administrator, the hypervisor namespace administrator comprising a plurality of logical virtual functions, and an arbitrator, the hypervisor namespace administrator to receive transactions from at least one host and the NVMe device and to emulate virtual NVMe devices and to allow access to the plurality of namespaces based on configuration information and arbitration logic implemented by the arbitrator.

21. The system as claimed in claim 20, the NVMe device comprising at least one I/O queue, and wherein the NVMe device to be enumerated in the first partition by the hypervisor namespace administrator through the virtual root complex circuit, the admin controller circuit and the at least one I/O queue of the NVMe device managed by the hypervisor namespace administrator.

22. The system as claimed in claim 20, wherein configuration information of the I/O controller circuit and a first namespace of the plurality of namespaces of the NVMe device to be read and stored by the hypervisor namespace administrator for emulation by the first logical virtual function.

23. The system as claimed in claim 20, wherein configuration information of the I/O controller circuit and a second namespace of the plurality of namespaces to be read and stored by the hypervisor namespace administrator for emulation by the second logical virtual function.

24. The system as claimed in claim 22, wherein the first namespace of the plurality of namespaces and the respective NVMe device to be emulated by the first logical virtual function coupled to a first host of the at least one host.

25. The system as claimed in claim 23, wherein the second namespace of the plurality of namespaces and the respective NVMe device to be emulated by the second logical virtual function coupled to a second host of the at least one host.

26. The system as claimed in claim 20, wherein the plurality of namespaces to be coupled to the at least one host through respective logical virtual functions.

27. The system as claimed in claim 20, wherein the arbitrator to allow access from one of a plurality of hosts to one of the plurality of namespaces of the NVMe device through the logical virtual function coupled to the respective host.

28. The system as claimed in claim 20, wherein the arbitrator to select an active host from the at least one host, the active host to be allowed to access the NVMe device and the arbitrator to temporarily suspend access to the NVMe device by non-active hosts.

29. The system as claimed in claim 28, the transactions between the at least one host and the NVMe device to be processed by the hypervisor namespace administrator through operations comprising at least one of an emulation of data, a bridging of transactions, a monitoring of transactions, creation of transactions and an update of transactions.

30. A method comprising:

configuring a PCIe switch to include a plurality of partitions, and to include one partition per host, respective hosts to be communicatively coupled to respective partitions;

configuring an additional partition, the additional partition to be communicatively coupled to an NVMe device, the NVMe device comprising a plurality of namespaces and the NVMe device not visible to any of the hosts;

configuring, in a hypervisor namespace administrator, a logical virtual function in respective partitions;

emulating a virtual NVMe device by the LVF to control access to one or more namespaces in the NVMe device;

selecting an active host from the plurality of hosts by an arbitrator in the hypervisor namespace administrator;

allowing, via the arbitrator, the active host to access the NVMe device;

suspending temporarily, via the arbitrator, access from the non-active hosts to the NVMe device;

processing, by the hypervisor namespace administrator, one or more transactions at the respective LVFs through operations comprising at least one of an emulation of data, a bridging of transactions, a monitoring of transactions, creation of transactions and an update of transactions, transactions comprising PCIe configuration transactions, NVMe admin transactions and NVMe I/O transactions;

bridging, by the hypervisor namespace administrator, the NVMe transactions between hosts and the NVMe device to enable access to the NVMe device by one or more hosts; and arbitrating between the NVMe transactions in the hypervisor namespace administrator based on a predetermined condition.

31. The method as claimed in claim 30, the HNA to emulate data based upon a determination that the response required for a transaction is available within the HNA.

32. The method as claimed in claim 30, the HNA to bridge transactions between the active host and the NVMe device based upon a determination that the active host can be provided access to the NVMe device.

33. The method as claimed in claim 30, the HNA to monitor transactions between the active host and the NVMe device based upon a determination that a completion of a NVMe I/O command is to be determined indicating that access from the active host to the NVMe device may be temporarily suspended and another of the respective hosts may become a new active host and may provide access to the NVMe device.

34. The method as claimed in claim 30, the HNA to create transactions to the host and the NVMe device based upon a determination that transactions are required to determine the status of NVMe I/O command completion.

35. The method as claimed in claim 30, the HNA to update transactions between the host and the NVMe device based upon a determination that at least one of the fields in the transaction is to be updated in a predetermined manner.

36. The method as claimed in claim 30, respective LVFs to allow respective hosts to access at least one of the one or more namespaces based on a configuration of the PCIe switch.

37. The method as claimed in claim 30, the predetermined condition comprising a priority-based arbitration, the arbitrating comprising sequencing multiple transactions.

38. The method as claimed in claim 30, the predetermined condition comprising a round-robin arbitration, the arbitrating comprising sequencing multiple transactions.

39. The method as claimed in claim 30, the PCIe switch comprising part of an Advanced Driver Assistance System (ADAS).

* * * * *